G. LAKE.
CEREAL PERCOLATOR.
APPLICATION FILED FEB. 14, 1911.
1,008,602.
Patented Nov. 14, 1911.
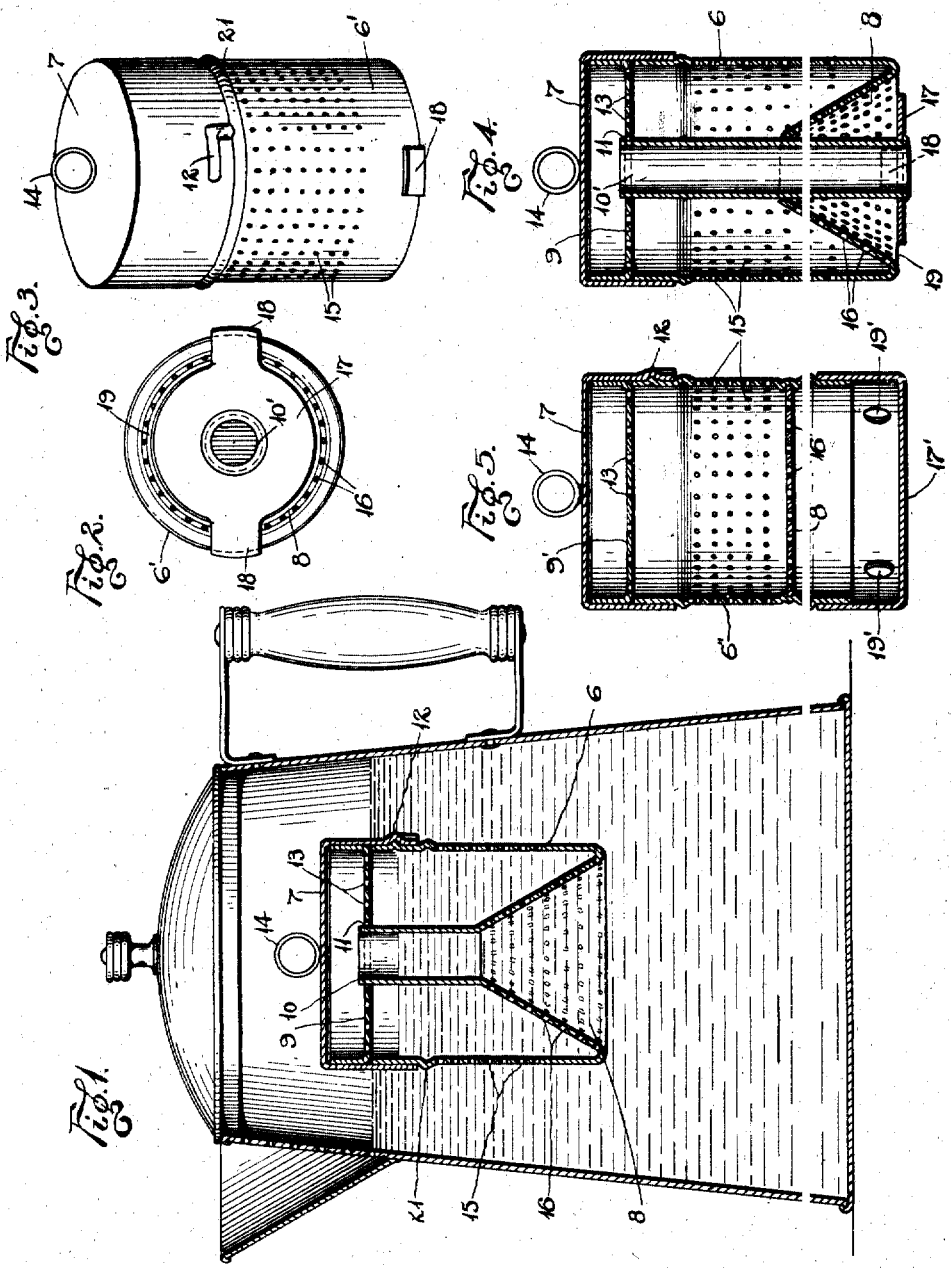
Witnesses:
Robert C. Dodd.
H. G. Harney.
Golladay Lake, Inventor,
By Thomas R. Harney
Monroe E. Miller
Attys.

UNITED STATES PATENT OFFICE.

GOLLADAY LAKE, OF CLEVELAND, OHIO.

CEREAL-PERCOLATOR.

1,008,602.  Specification of Letters Patent.  Patented Nov. 14, 1911.

Application filed February 14, 1911. Serial No. 608,608.

*To all whom it may concern:*

Be it known that I, GOLLADAY LAKE, a citizen of the United States, residing at 1208 Euclid avenue, Cleveland, in the county of Cuyahoga and State of Ohio, have invented certain new and useful Improvements in Cereal-Percolators, of which the following is a specification.

This invention relates to percolators, and especially to percolators for boiling coffee, tea, and other cereals.

The object of this invention is to provide a percolator adapted to contain the cereal to be boiled and float in the vessel containing the boiling fluid, allowing the liquid to percolate through the cereal particles, to efficiently boil same, and being capable of ready removal when the cereal is sufficiently boiled; and to provide a percolator which shall be inexpensive to manufacture and which will be hygienic in its use, and which can be used in connection with the present coffee pots, kettles, or other receptacles.

Further objects will be evident from the hereinafter description.

The invention is embodied in a novel construction and arrangement of parts, as hereinafter described and as shown in the accompanying drawings, in which similar reference characters indicate similar parts, and in which—

Figure 1 is a vertical section of one form of the device as floating in a coffee pot containing water or other fluid. Fig. 2 is a bottom view of another form. Fig. 3 is a perspective thereof. Fig. 4 is a vertical section of the second form. Fig. 5 is a vertical section of a third form of the device.

Reference being had to the drawings, 6 indicates a cylindrical casing composed of suitable material, which has its upper end open and having a perforated conical bottom 8. This bottom is preferably stamped integrally with the casing 6, and has an opening at the apex thereof, from which extends the upright tubular member 10. In the sides of the casing 6 are numerous perforations 15. The perforations in the bottom 8 are indicated at 16.

A cap 7 is provided for the upper end of the casing 6 and is secured thereto by means of the bayonet joint shown at 12. Between the said cap and the top of the casing 6 is arranged a cup 9, which has perforations 18 in the bottom thereof and a central opening 11 through which extends the tubular member 10 to a slight distance above the bottom thereof. This cup forms a perforated partition below the top of the cap 7. A ring or loop 14 is secured to the top of the said cap 7. The rib or annular swell 21 in the casing 6 serves to strengthen the said casing and forms a seat for the cap 7.

In the modified form shown in Figs. 2, 3 and 4 a plate 17 of smaller diameter than the casing 6' is arranged at the bottom thereof and is engaged to the casing by lips 18 projecting therefrom. The said plate being of smaller diameter than the casing 6' provides the opening 19 to the chamber formed by the plate 17 in under the conical bottom 8. The tubular member 10' passes through the conical bottom 8 and through the plate 17 to form a passage from below the casing to the upper or air chamber formed within the cup 9.

In the form shown in Fig. 5 the tubular member is omitted and a flat bottom 8' is arranged in the lower end of the casing 6''. The upper cup 9' within the cap 7 therefore has no central opening for the tubular member. A lower cup 17' fits over the bottom of the casing 6'' and has several openings 19' around the sides thereof.

In use, the cereal to be boiled is placed in the cereal chamber formed within the casing 6 and the device is then placed in the water or other liquid in which the cereal is to be boiled. When the percolator is placed into the liquid the liquid enters the casing through the bottom and sides to fill same, and also the tube 10, but the top of the casing being closed by cap 7 prevents the fluid from completely filling the device, and as a result an upper air space is formed within the cup 9, which floats the device and supports the upper end above the surface of the liquid. As the water boils, steam accumulates in the upper end of the device and forces part of the liquid in the casing out, and as the pressure is released there is an inrush of fresh water or liquid up through the tube 10 and through the perforations in the sides and bottom of the casing. It will therefore be seen that as the liquid boils the action of the boiling liquid and steam keeps the cereal particles in a constant tumultuous state, to thoroughly boil the cereal and steam same, thus extracting all the best properties thereof. The partition formed by the cup 9 prevents the cereal in becoming soaked and swelled from filling up the upper air space to force out the air, and thus preserves the air space. The upper end of the device also being above the surface of the water is cooler than the submerged portion and tends to cool the steam in the upper end, thus letting the liquid precipitate downward through the perforations 13. The perforations in the side of the casing preserves the equilibrium of the device in the liquid, and also allows for a free circulation of the liquid through the casing.

The action of the liquid in the modified forms is very much similar to the above, and is modified inasmuch as the constructions thereof are modified.

The percolator in being removed by means of the loop 14 takes with it the boiled cereal to leave the liquid as if strained.

The device is adapted especially for family use, but can be adapted for restaurant or other uses.

Various other modifications and alterations can be made within the scope of the appended claims, and no limitations are inferred by the specific constructions shown and described.

Having described my invention, what I claim as new is:—

1. An article of manufacture of the character described and adapted for use with boiling receptacles comprising a casing adapted to contain cereals and having perforations therein, a cap for the upper end of the casing forming an air and steam space thereinunder to float the casing, a perforated partition at the upper end of the said casing forming a screened opening for communication between the cereal chamber and the upper air and steam space and for preventing the cereal from entering the said space, and a tubular member extending from the bottom of the said casing through the said partition.

2. An article of manufacture of the character described and adapted for use with boiling receptacles comprising a casing having a perforated conical bottom, a cap for the upper end of the casing forming an air and steam space thereinunder to float the casing, a perforated cup within the said cap forming a screened opening for communication between the cereal chamber and the said air and steam space and for preventing the cereal from entering the said space, and a tubular member extending from the apex of the conical bottom through the said cup forming a passage from the air and steam space within the said cup through the said conical bottom.

In testimony whereof I do affix my signature in presence of two witnesses.

GOLLADAY LAKE.

Witnesses:
MONROE E. MILLER,
EUGENE E. WOLF.